(12) United States Patent
Berthold et al.

(10) Patent No.: US 8,663,790 B2
(45) Date of Patent: Mar. 4, 2014

(54) PE MOULDING COMPOSITION FOR PRODUCING INJECTION-MOLDED SCREW CAP CLOSURES AND HIGH-STRENGTH SCREW CAP CLOSURE FOR CARBONATED BEVERAGES PRODUCED THEREWITH

(75) Inventors: Joachim Berthold, Grassau (DE); Diana (nee Boos) Doetsch, Mainz (DE); Gerhardus Meier, Frankfurt (DE); Albert Weber, Cervello (ES)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 12/735,139

(22) PCT Filed: Dec. 13, 2008

(86) PCT No.: PCT/EP2008/010620
§ 371 (c)(1),
(2), (4) Date: Nov. 23, 2010

(87) PCT Pub. No.: WO2009/077142
PCT Pub. Date: Jun. 25, 2009

(65) Prior Publication Data
US 2011/0062108 A1    Mar. 17, 2011

Related U.S. Application Data

(60) Provisional application No. 61/124,390, filed on Apr. 16, 2008.

(30) Foreign Application Priority Data

Dec. 18, 2007 (EP) ..................................... 07024507

(51) Int. Cl.
*B32B 27/00* (2006.01)
*B29C 47/00* (2006.01)

(52) U.S. Cl.
USPC ......................................... 428/220; 525/240

(58) Field of Classification Search
USPC .................... 428/220; 215/329; 525/53, 240; 264/328.1
See application file for complete search history.

(56) References Cited

U.S. PATENT DOCUMENTS

| | | | | |
|---|---|---|---|---|
| 4,438,238 A | * | 3/1984 | Fukushima et al. | 525/240 |
| 4,940,629 A | * | 7/1990 | Weber et al. | 428/213 |
| 5,648,309 A | | 7/1997 | Böhm | |
| 6,713,561 B1 | * | 3/2004 | Berthold et al. | 525/191 |
| 2008/0274353 A1 | | 11/2008 | Vogt et al. | |
| 2009/0105422 A1 | | 4/2009 | Berthold et al. | |
| 2010/0010163 A1 | | 1/2010 | Berthold et al. | |

FOREIGN PATENT DOCUMENTS

| | | |
|---|---|---|
| DE | 102005030941 | 1/2007 |
| WO | WO 2005103096 A1 * | 11/2005 |
| WO | WO-2006053740 | 5/2006 |
| WO | WO-2007022908 | 3/2007 |

\* cited by examiner

*Primary Examiner* — David Sample
*Assistant Examiner* — Tahseen N Khan

(57) ABSTRACT

The invention relates to a polyethylene molding composition having a multimodal molecular mass distribution and comprising a first ethylene homopolymer fraction (I), a second ethylene copolymer fraction (II) and a third ethylene copolymer fraction (III). The molding composition has a density at a temperature of 23° C. in the range from 0.945 to 0.953 g/cm$^3$, an MFR (190° C./5 kg) in the range from 2 to 7 g/10 min and a viscosity number $VN_3$ of the total mix of ethylene homopolymer fraction (I), copolymer fraction (II) and ethylene copolymer fraction (III), measured in accordance with ISO/R 1191 in decalin at a temperature of 135° C., in the range from 200 to 250 cm$^3$/g. The invention further relates to the use of such a molding composition for producing high-strength injection-molded screw cap closures for bottles comprising beverages, especially carbonated beverages.

8 Claims, No Drawings

PE MOULDING COMPOSITION FOR PRODUCING INJECTION-MOLDED SCREW CAP CLOSURES AND HIGH-STRENGTH SCREW CAP CLOSURE FOR CARBONATED BEVERAGES PRODUCED THEREWITH

This application claims priority to European Patent Application 07024507.1 filed 18 Dec. 2007 and provisional U.S. Appl. No. 61/124,390 filed 16 Apr. 2008; the disclosures of European Application 07024507.1 and U.S. Appl. No. 61/124,390, each as filed, are incorporated herein by reference.

The present invention relates to a polyethylene molding composition having a multimodal molecular mass distribution particularly suitable for producing injection-molded screw cap closures, for example closures for bottles, and to a process for preparing this molding composition in the presence of a suitable catalyst, preferably of a Ziegler catalyst.

The invention further relates to the use of such a molding composition for producing injection-molded screw cap closures having improved mechanical properties.

The expressions "polyethylene molding composition which has a multimodal molecular mass distribution" or simply "multimodal polyethylene" refer to a polyethylene molding composition or a polyethylene having a molecular mass distribution curve of multimodal configuration, i.e. a polyethylene comprising a plurality of ethylene polymer fractions having distinct molecular weights. For example, according to a preferred embodiment of the present invention, a multimodal polyethylene can be prepared via a multistage reaction sequence comprising successive polymerization steps carried out under predetermined different reaction conditions in respective reactors arranged in series so as to obtain respective polyethylene fractions having different molecular weight. A process of this type can be performed in a suspension medium: in this case, monomers and a molar mass regulator, preferably hydrogen, are firstly polymerized in a first reactor under first reaction conditions in the presence of a suspension medium and a suitable catalyst, preferably a Ziegler catalyst, then transferred to a second reactor and further polymerized under second reaction conditions, and, if the polyethylene to be prepared is for example trimodal, further transferred to a third reactor and further polymerized under third reaction conditions, with the first reaction conditions differing from the second and third reaction conditions so as to obtain three polyethylene fractions having different molecular weights. This difference in molecular weight in the different ethylene polymer fractions is normally evaluated through the weight average molecular weight $M_w$.

Although Ziegler catalysts are particularly suitable for the preferred applications of the present invention, it is also possible to use other catalysts, for example catalysts having a uniform catalyst center (or "single site" catalysts), e.g. metallocene catalysts.

Polyethylene is widely used for producing injection-molded finished parts. The polyethylenes used for this purpose should have a high mechanical strength and stiffness in order to be suitable to produce thin-walled injection-molded parts. In addition, the material has to have a high degree of environmental stress cracking resistance. If the finished parts are used as food packaging, the material also has to have excellent organoleptic properties. In addition, for the above-mentioned injection-molding applications, the molding composition has to be easily processable, in particular by injection molding.

Polyethylene molding compositions having an unimodal molecular mass distribution, i.e. comprising a single ethylene polymer fraction having a predetermined molecular weight, have disadvantages in terms of processability, environmental stress cracking resistance and mechanical toughness, which are unsatisfactory for injection-molded screw cap closure applications.

In comparison, molding compositions having a bimodal molecular mass distribution represent a technical step forward. A molding composition for injection-molded finished parts based on polyethylene which has a bimodal molecular mass distribution can be processed relatively easily and exhibits better mechanical properties compared to conventional unimodal molding compositions. Although a molding composition having a bimodal molecular mass distribution is easier to be processed and has a better environmental stress cracking resistance and a higher mechanical strength at the same density with respect to an unimodal molding composition, there remains an additional need to find a balance between stiffness and elasticity of a molding composition to make it especially suitable for the technical requirements in screw cap closure applications.

It is therefore an object of the present invention to provide a molding composition which is based on a polyethylene blend and has significant advantages in respect of mechanical strength combined with stiffness and residual elasticity, while retaining good processability when processed by injection moulding technology.

This object is achieved by a molding composition having a multimodal molecular mass distribution comprising from 40 to 45% by weight of a first ethylene homopolymer fraction (I), from 35 to 40% by weight of a second ethylene copolymer fraction (II) and 15 to 20% by weight of a third ethylene copolymer fraction (III), with all percentages being based on the total weight of the molding composition, wherein the molding composition has a density at a temperature of 23° C. in the range from 0.945 to 0.953 g/cm³, an MFR (190° C./5 kg) in the range of from 2 to 7 g/10 min and a viscosity number $VN_3$ of the mixture of ethylene homopolymer fraction (I), copolymer fraction (II) and ethylene copolymer fraction (III), measured in accordance with ISO/R 1191 in decalin at a temperature of 135° C., in the range from 200 to 250 cm³/g.

The expressions "first ethylene homopolymer (I)", "second ethylene copolymer (II)" and "third ethylene copolymer (III)" refer to an ethylene homopolymer (I), an ethylene copolymer (II) and an ethylene copolymer (III), respectively, which differ from each other with respect to their molecular weights, preferably they have increasing molecular weight, if regarded from (I) going to (II) going to (III).

Due to the combination of features described hereinbefore, and in particular thanks to the multimodal molecular mass distribution of the ethylene polymer in combination with these particular ranges for MFR, viscosity number $VN_3$ and density, the polyethylene molding composition of the present invention can be advantageously processed more easily, while maintaining thereafter improved strength and stiffness combined with residual elasticity making it especially suitable for screw cap closure applications.

The second ethylene copolymer fraction (II) and/or the third ethylene copolymer fraction (III) are preferably copolymers of ethylene and at least a further olefin which preferably comprises from 4 to 8 carbon atoms. Ethylene is, thus, used as monomer and the comonomer used is preferably 1-butene, 1-pentene, 1-hexene, 1-octene, 4-methyl-1-pentene or a combination of these. Preferred comonomers are 1-butene, 1-hexene and 4-methyl-1-pentene. Particular preference is given to 1-butene.

The second ethylene copolymer fraction (II) preferably comprises at least one comonomer in an amount in the range from 0.6 to 4% by weight, more preferably in the range from 0.8 to 3% by weight, in particular in the range from 1.0 to 2% by weight, based on the weight of second copolymer fraction (II).

The third ethylene copolymer fraction (III) preferably comprises at least one comonomer in an amount in the range from 5 to 10% by weight, more preferably in the range from 6 to 9% by weight, particularly preferably in the range from 7 to 8% by weight, based on the weight of third ethylene copolymer fraction (III).

The third ethylene copolymer fraction (III) preferably comprises one or more of the comonomers mentioned above by way of example, wherein particular preference is again given to 1-butene.

These preferred amounts of comonomers make it possible to achieve an improved combination of properties of the moulding composition. Within these preferred ranges, it is possible to adjust the elasticity of the polyethylene moulding composition in such a way as to achieve a maintained thread conformity of the cap closure after the decapping process. Due to the proper ethylene distribution and molecular weight within each polymer fraction (I), (II) and (III), the moulding composition has advantageously improved flowing properties. For that reason it can be processed at lower temperatures during the injection moulding process of the screw cap closures, if compared with standard unimodal ethylene polymers. As a result, the material shows improved processability and the final screw cap closure fulfills even the highest requirements for thread conformity.

The polyethylene molding composition preferably has a density at a temperature of 23° C. in the range from 0.947 to 0.953 g/cm$^3$, more preferably in the range from 0.948 to 0.953 g/cm$^3$, in particular in the range from 0.949 to 0.953 g/cm$^3$.

Surprisingly, the restoring force of the polymer in combination with residual elasticity guarantees high thread conformity in the final screw cap without substantially altering the other mechanical properties.

The polyethylene molding composition preferably has a viscosity number $VN_3$ of the mixture of first ethylene homopolymer fraction (I), second ethylene copolymer fraction (II) and third ethylene copolymer fraction (III), measured in accordance with ISO/R 1191 in decalin at a temperature of 135° C., in the range from 200 to 240 cm$^3$/g, more preferably in the range from 210 to 240 cm$^3$/g, in particular in the range from 210 to 230 cm$^3$/g.

The polyethylene molding composition preferably has a melt flow index in accordance with ISO 1133, expressed as MFR (190° C./5 kg), in the range of from 3 to 7 g/10 min, more preferably in the range from 3.5 to 6.5 g/10 min, in particular in the range from 4 to 6.5 g/10 min.

The polyethylene molding composition is preferably prepared by means of a multistage reaction sequence comprising successive polymerization steps following one after each other. For example, when the reaction sequence has three stages, a trimodal polyethylene molding composition is produced, while when the reaction sequence has four stages, a quadrimodal polyethylene molding composition is produced.

In order to obtain a multimodal polyethylene, the polymerization can be carried out in a multistage process, i.e. in a plurality of stages carried out in respective reactors connected in series, with the molecular weight preferably being regulated in each step by means of a molecular weight regulator, preferably by hydrogen. In particular, the polymerization process is preferably carried out with the highest hydrogen concentration being set in the first reactor. In the subsequent, further reactors, the hydrogen concentration is preferably gradually reduced, so that the hydrogen concentration used in the third reactor is lower with respect to hydrogen concentration used in the second reactor. Preferably, in the second reactor and in the third reactor a predetermined comonomer concentration is used, preferably increasing from the second reactor to the third reactor. As stated above, in the stages where a copolymer fraction is prepared, preferably in the second reactor and in the third reactor, ethylene is, thus, used as monomer and an olefin having from 4 to 8 carbon atoms is preferably used as comonomer.

The molecular mass distribution of the polyethylene molding composition of the present invention is preferably trimodal. In this way, it is possible to obtain the abovementioned advantageous combination of properties without excessively complicating the production process by providing three reactors in series and thus advantageously maintaining the dimensions of the plant.

So, in order to prepare a trimodal polyethylene molding composition, the polymerization of ethylene is preferably carried out in the presence of a suitable polymerization catalyst in a continuous process performed in three reactors connected in series. Different reaction conditions are thereby respectively set in the three reactors.

Preferably, the polymerization is performed in suspension. A suitable catalyst, for example a Ziegler catalyst, is preferably fed into the first reactor together with a sufficient amount of suspension medium, with cocatalyst, with ethylene and with hydrogen. Preferably, any comonomer is not introduced in the first reactor.

The suspension from the first reactor is thereafter transferred into a second reactor in which ethylene, hydrogen and preferably in addition a predetermined amount of comonomer, for example 1-butene, are added. The amount of hydrogen fed into the second reactor is preferably reduced, if compared with the amount of hydrogen fed in the first reactor.

The suspension from the second reactor is transferred to the third reactor. In the third reactor, ethylene, hydrogen and preferably a predetermined amount comonomer, for example 1-butene, preferably in an amount higher than the amount of comonomer used in the second reactor, are introduced. The amount of hydrogen in the third reactor is reduced compared to the amount of hydrogen in the second reactor. From the polymer suspension leaving the third reactor the suspension medium is separated and the resulting polymer powder is dried and thereafter preferably transferred to pelletization.

The polyethylene is obtained by polymerization of the monomers, for example in suspension, preferably at temperatures in the range from 70 to 90° C., preferably from 80 to 90° C., at a preferred pressure in the range from 2 to 20 bar, preferably from 2 to 10 bar. The polymerization is preferably carried out in the presence of a suitable catalyst, for example a Ziegler catalyst, preferably sufficiently active to ensure a predetermined productivity of multistage process. The Ziegler catalyst is preferably composed of a transition metal compound and an organoaluminum compound.

The preferred trimodality, i.e. the preferred trimodal configuration of the molecular mass distribution curve, can be described in terms of the position of the centers of gravity of the three individual molecular mass distributions by means of the viscosity numbers VN in accordance with ISO/R 1191 of the polymers obtained after each polymerization stages.

The first ethylene homopolymer fraction (I) is preferably formed in the first polymerization step. In this preferred embodiment, the viscosity number $VN_1$ measured on the polymer obtained after the first polymerization step is the viscosity number of the first ethylene homopolymer fraction (I) and is preferably in the range of from 130 to 160 cm³/g, more preferably from 140 to 160 cm³/g, in particular from 140 to 150 cm³/g.

According to alternative embodiments, either the second ethylene copolymer fraction (II) or the third copolymer fraction (III) may be formed in the first polymerization step. However, the second ethylene copolymer fraction (II) is preferably formed in the second polymerization step.

According to a particularly preferred embodiment of the preparation method, in which the first ethylene homopolymer fraction (I) is formed in the first polymerization step and the second ethylene copolymer fraction (II) is formed in the second polymerization step, the viscosity number $VN_2$ measured on the polymer obtained after the second polymerization step is the viscosity number of the mixture of the first ethylene homopolymer fraction (I) and of the second ethylene copolymer fraction (II). $VN_2$ is preferably in the range from 140 to 180 cm³/g, more preferably from 150 to 180 cm³/g, in particular from 155 to 170 cm³/g.

In this preferred embodiment, starting from these measured values of $VN_1$ and $VN_2$, the theoretical viscosity number $VN_{(II)}$ of the second ethylene copolymer fraction (II) cannot be measured somehow, but must rather be calculated from the following empirical formula:

$$VN_B = \frac{VN_2 - w_1 \cdot VN_1}{1 - w_1}$$

wherein $w_1$ is the proportion by weight of the first ethylene homopolymer fraction formed in the first polymerization step, measured in % by weight, based on the total weight of the polyethylene having a bimodal molecular weight distribution formed in the first two steps, and wherein $VN_B$ represents $VN_{(II)}$.

The third ethylene copolymer fraction (III) is preferably formed in the third polymerization step. In this preferred embodiment, as well as in the alternative embodiments where a different order of polymerization is provided, the viscosity number $VN_3$ measured on the polymer obtained after the third polymerization step is the viscosity number of the mixture of the first ethylene homopolymer fraction (I), of the second ethylene copolymer fraction (II) and of the third ethylene copolymer fraction (III). $VN_3$ is preferably within the preferred ranges already defined above, i.e. in the range from 200 to 240 cm³/g, more preferably in the range from 210 to 240 cm³/g, in particular in the range from 210 to 230 cm³/g.

In this preferred embodiment, starting from these measured values of $VN_2$ and $VN_3$, the theoretical viscosity number $VN_{(III)}$ of the third copolymer fraction (III) formed in the third polymerization step cannot be measured somehow too, but must again be calculated from the following empirical formula:

$$VN_C = \frac{VN_3 - w_2 \cdot VN_2}{1 - w_2}$$

where $w_2$ is the proportion by weight of the polyethylene having a bimodal molecular weight distribution formed in the first two steps, measured in % by weight, based on the total weight of the polyethylene having a trimodal molecular weight distribution formed in all three steps, and wherein $VN_C$ represents $VN_{(III)}$.

Although the way to calculate the viscosity numbers of each ethylene polymer fraction of the polyethylene molding composition has been given with reference to a preferred case in which the first ethylene homopolymer fraction (I), the second copolymer fraction (II) and, respectively, the third copolymer fraction (III) are obtained in this order, this calculation method may apply also to different polymerization orders. In any case, in fact, independently from the order of production of the three ethylene polymer fractions, the viscosity number of the first ethylene polymer fraction is equal to the viscosity number $VN_1$ measured on the ethylene polymer obtained after the first polymerization step, the viscosity number of the second ethylene polymer fraction (II) must be calculated starting from the proportion by weight $w_1$ of the first ethylene polymer fraction formed in the first polymerization step, measured in % by weight, based on the total weight of the polyethylene having a bimodal molecular weight distribution formed in the first two steps and from the viscosity numbers $VN_1$ and $VN_2$ measured on the polymers obtained after the second and, respectively, the third polymerization step, while the viscosity number of the third ethylene polymer fraction (III) can be calculated starting from the proportion by weight $w_2$ of the polyethylene having a bimodal molecular weight distribution formed in the first two steps, measured in % by weight, based on the total weight of the polyethylene having a trimodal molecular weight distribution formed in all three steps and from the viscosity numbers $VN_2$ and $VN_3$ measured on the polymers obtained after the second and, respectively, the third polymerization step.

The special combination of features in terms of high restoring force in combination with residual elasticity is the result of the trimodal composition of the polymer. Even though the molecular weight distribution is rather narrow in order to avoid warpage of the final screw cap, the processability, expressed as spiral flow or spiral length, is still improved in comparison with other known bimodal ethylene polymers. As the molecular weight distribution or the polydispersity is expressed as $M_w/M_n$, the value of $M_w/M_n$ for the ethylene polymer moulding composition according to the instant invention ranges from 6 to 10, preferably from 6 to 9, more preferred from 7 to 9.

The polyethylene molding composition of the instant invention may further comprise additional optional additives. Such additives are, for example, heat stabilizers, antioxidants, UV absorbers, light stabilizers, metal deactivators, peroxide-destroying compounds, basic costabilizers in amounts of from 0 to 10% by weight, preferably from 0 to 5% by weight, but also carbon black, fillers, pigments, flame retardants, or combinations of these in total amounts of from 0 to 50% by weight, based on the total weight of the mixture.

The molding composition of the invention can advantageously be injection-moulded to produce injection-moulded, preferably rotationally symmetric, finished parts, e.g. screw cap closures for blow-molded plastic parts or bottles. It was highly surprising and not to foresee that screw cap closures prepared from the moulding composition according to the instant invention possess high quality properties to such an extent, especially with respect to high thread conformity and easier processability. Therefore they are preferably suitable as high strength closures for carbonated beverages such as carbonated water, limonades and beer maintaining the high pressure inside the bottle or container over a long time period.

WORKING EXAMPLES

Example 1

Invention

The polymerization of ethylene was carried out in a continuous process in three reactors connected in series. A Ziegler catalyst which had been prepared by the method disclosed by WO 91/18934, Example 2 under the operation number 2.2, were fed into the first reactor in an amount of 6.7 mmol/h, together with sufficient hexane as suspension medium, triethylaluminum as cocatalyst in an amount of 120 mmol/h, ethylene and hydrogen. The amount of ethylene (=50.6 kg/h) and the amount of hydrogen (=27 g/h) were set so that a proportion of 43% by volume of ethylene and a proportion of 43% by volume of hydrogen were measured in the gas space of the first reactor; the remainder was a mixture of nitrogen and vaporized suspension medium. The polymerization in the first reactor was carried out at a temperature of 82° C. The suspension from the first reactor was thereafter transferred to a second reactor into which an amount of 43.7 kg/h of ethylene, 6 g/h of hydrogen and 485 g/h of 1-butene was added. In the second reactor, the concentration of ethylene in the gas space was 58° A) by volume, 29° A) by volume of hydrogen and 2° A) by volume of 1-butene; the remainder was a mixture of nitrogen and vaporized suspension medium. The polymerization in the second reactor was carried out at a temperature of 84° C. The suspension from the second reactor was transferred into the third reactor. An amount of 20.7 kg/h of ethylene, 0 to 0.5 g/h of hydrogen and also an amount of 1500 g/h of 1-butene were introduced into the third reactor. A proportion of ethylene of 73% by volume, a proportion of hydrogen of 7.5% by volume and a proportion of 1-butene of 6.3% by volume were measured in the gas space of the third reactor; the remainder was a mixture of nitrogen and vaporized suspension medium. The polymerization in the third reactor was carried out at a temperature of 84° C. The suspension medium was separated from the polymer suspension leaving the third reactor and the remaining polymer powder was dried and pelletized.

Screw cap closures having a diameter of 30 mm and a wall thickness of 1 mm were injection-molded at a melt temperature of 225° C. and an injection pressure of 1570 bar. The surface temperature of the tool was 30° C. The screw cap closures produced had a defect-free surface and a ready to use and satisfactory thread conformity.

The viscosity numbers as described above and the proportions $W_{(I)}$, $W_{(II)}$ and $W_{(III)}$ of polymer fractions (I), (II) and (III) for the polyethylene molding composition prepared as described in working example 1 are indicated in the Table at the very end divided into powder and pellet properties.

Example 2

Comparative Example

The polymerization of ethylene was carried out in a continuous process in three reactors connected in series. A Ziegler catalyst which had been prepared by the method of WO 91/18934, Example 2, under the operation number 2.2, was fed into the first reactor in an amount of 8 mmol/h together with sufficient suspension medium, triethylaluminum as cocatalyst in an amount of 212 mmol/h, ethylene and hydrogen. The amount of ethylene (=53 kg/h) and the amount of hydrogen (=32 g/h) were set so that a proportion of 35.5% by volume of ethylene and a proportion of 50.5% by volume of hydrogen were measured in the gas space of the first reactor. The polymerization in the first reactor was carried out at a temperature of 82° C. The suspension from the first reactor was then transferred to a second reactor into which an amount of 41.1 kg/h of ethylene and 16 g/h of hydrogen were introduced. 49% by volume of ethylene and 39% by volume of hydrogen were measured in the gas space of the second reactor; the remainder was a mixture of nitrogen and vaporized suspension medium. The polymerization in the second reactor was carried out at a temperature of 84° C.

The suspension from the second reactor was transferred into the third reactor via an intermediate $H_2$ depressurization, by means of which the amount of hydrogen in the gas space in the third reactor was set to 1.5° A) by volume. An amount of 20.7 kg/h of ethylene and an amount of 2700 g/h of 1-butene were introduced into the third reactor. A proportion of ethylene of 72° A) by volume and a proportion of 1-butene of 14° A) by volume were measured in the gas space of the third reactor; the remainder was a mixture of nitrogen and vaporized suspension medium. The polymerization in the third reactor was carried out at a temperature of 84° C. The suspension medium was separated from the polymer suspension leaving the third reactor and the remaining polymer powder was dried and pelletized.

Screw cap closures having a diameter of 30 mm and a wall thickness of 1 mm were injection-molded at a melt temperature of 225° C. and an injection pressure of 1570 bar. The surface temperature of the tool was 30° C. The closures produced did not show satisfactory thread conformity.

The viscosity numbers as described above and the proportions $W_{(I)}$, $W_{(II)}$ and $W_{(III)}$ of polymer fractions (I), (II) and (III) for the polyethylene molding composition prepared as described in the comparative example are indicated together with that of working example 1 in the Table below.

Example 3

Comparative Example

A commercially available product named ELTEX B4020 N 1331 available from Ineos Europe Ltd. was processed in the same manner as the moulding compositions pursuant examples 1 and 2 to result in screw cap closures having a diameter of 30 mm and a wall thickness of 1 mm. However, the screw cap could not be processed at a temperature of 225° C., but the melt temperature had to be increased to 240° C. The closures produced have had a defect-free surface and satisfactory thread conformity.

The pellet properties of the comparative material are incorporated and indicated in the table below.

TABLE

|  | Example 1 (Invention) PE powder | Example 1 (Invention) pellets | Example 2 (Comp.) PE powder | Example 2 (Comp.) pellets | Example 3 (Comp.) pellets |
|---|---|---|---|---|---|
| $W_{(I)}$ [Gew.-%] | 44 |  | 46 |  |  |
| $W_{(II)}$ [Gew.-%] | 38 |  | 36 |  |  |
| $W_{(III)}$ [Gew.-%] | 18 |  | 18 |  |  |
| $VZ_1$ [cm³/g] (Fract. 1) | 146 |  | 139 |  |  |
| $VZ_2$ [cm³/g] (Fract. 1 + 2) | 168 |  | 145 |  |  |

TABLE-continued

|  | Example 1 (Invention) PE powder | Example 1 (Invention) pellets | Example 2 (Comp.) PE powder | Example 2 (Comp.) pellets | Example 3 (Comp.) pellets |
|---|---|---|---|---|---|
| $VZ_{ges}$ [cm³/g] (Fract. 1 + 2 + 3) | 220 | 218 | 207 | 194 | 191 |
| $MFR_{5/190° C.}$ (Fract. 1) | 20 [g/10 min] |  | 50 [g/10 min] |  |  |
| $MFR_{5/190° C.}$ (Fract. 1 + 2) | 12 [g/10 min] |  | 30 [g/10 min] |  |  |
| $MFR_{5/190° C.}$ (fract. 1 + 2 + 3) | 6.3 [g/10 min] | 5.9 [g/10 min] | 7.5 [g/10 min] | 6.3 [g/10 min] | 7.0 [g/10 min] |
| Comonomer $C_4$ (fract. 1) | — |  | — |  |  |
| density [g/cm³] (fract. 1) | 0.964 |  | 0.965 |  |  |
| Comonomer $C_4$ (fract. 2) | 13 [g/kg $C_2$] |  | — |  |  |
| density [g/cm³] (fract 1 + 2) | 0.957 |  | 0.962 |  |  |
| Comonomer $C_4$ (fract. 3) | 73 [g/kg $C_2$] |  | 130 [g/kg $C_2$] |  |  |
| density [g/cm³] (fract. 1 + 2 + 3) | 0.953 | 0.952 | 0.954 | 0.954 | 0.953 |
| FNCT-Test (50° C./6 MPa) |  | 8 [h] |  | 11 [h] | 5.6 [h] |
| $M_w/M_n$ | 7-9 | 7-9 | 11-13 | 11-13 | 8 |
| Spiral length test at 190° C., 1050 bar, 1 mm thickness |  | 127 [mm] |  | 150 [mm] | 117 [mm] |

The abbreviations in the Table above have the following meanings:

$W_{(I)}$, $W_{(II)}$, $W_{(III)}$=weight, in [%], of the first ethylene homopolymer fraction (I), of the second copolymer fraction (II) and of the third ethylene copolymer fraction (III), respectively;

$VN_1$, $VN_2$, $VN_3$=viscosity number, in [cm³/g], of the first ethylene homopolymer fraction (I), of the mixture of polymer fraction (I) and polymer fraction (II) and of the mixture of ethylene homopolymer fraction (I), copolymer fraction (II) and ethylene copolymer fraction (III), respectively, measured in accordance with ISO/R 1191 in decalin at a temperature of 135° C.;

Density: measured at 23° C. in accordance with ISO 1183, in [g/cm³];

MFR(190° C./5 kg)=melt flow index in accordance with ISO 1133, in [g/10 min];

ESCR=environmental stress cracking resistance measured by the method of M. Fleißner (Full Notch Creep Test), in [h], under the conditions: 50° C., 6 MPa, water/2% of Arkopal. This laboratory method is described by M. Fleißner in Kunststoffe 77 (1987), p. 45 ff., and corresponds to ISO/CD 16770. This publication shows that there is a relationship between the determination of slow crack growth in the creep test on test bars having a circumferential notch and the brittle branch of the long-term internal pressure test in accordance with ISO 1167. A shortening of the time to failure is achieved by shortening the crack initiation times by means of the notch (notch depth of 1.6 mm/razor blade) in 2% strength aqueous Arkopal solution as stress crack promoting medium at a temperature of 80° C. and a tensile stress of 2.5 MPa. The specimens are produced by sawing three test specimens having dimensions of 10×10×90 mm from a 10 mm thick pressed plate. The test specimens are notched around their circumference in the middle by means a razor blade in a notching apparatus constructed in-house (cf. FIG. 5 in the publication).

Spiral length=length of the spiral, in [mm], which is produced in the spiral test, where a spiral is injection molded from the polymer. As is known in injection-molding applications, the resulting length of a test spiral produced by injection molding is a measure of the processing behavior in injection-molding processes. The figures reported are based on an injection temperature of 190° C. at an injection pressure of 1050 bar and a wall thickness of the spirals of 1 mm.

As the result of the tests it is to see that only the polyethylene moulding composition of example 1 was good in processability and in combination therewith also in thread conformity, as well. The material pursuant comparative example 2 is superior in processability, but is only poor in thread conformity, whereas the commercial material of example 3 has the disadvantage of poor processability, but comes out with good thread conformity.

The invention claimed is:

1. A high-strength injection-molded screw cap closure comprising:
 a polyethylene molding composition having a multimodal molecular mass distribution and comprising:
 (A) 40 to 45% by weight of a first ethylene homopolymer fraction having:
   (i) a first molecular weight; and
   (ii) a viscosity number, $VN_1$, between 130 and 160 cm³/g;
 (B) 35 to 40% by weight of a second ethylene copolymer fraction comprising:
   (i) 96 to 99.4% by weight, based on the weight of the second ethylene copolymer, ethylene derived units; and,
   (ii) 0.6 to 4% by weight, based on the weight of the second ethylene copolymer, at least one additional first olefin derived units wherein the first olefin derived units are selected from first comonomers comprising 4-8 carbon atoms, wherein the second ethylene copolymer fraction has:
- (iii) a second molecular weight wherein the second molecular weight is higher than the first molecular weight;
- (iv) a molecular weight distribution (Mw/Mn) between 6 and 10; and,
- (v) a viscosity number, $VN_2$, between 155 and 170 $cm^3/g$;

(C) 15 to 20% by weight of a third ethylene copolymer comprising:
- (i) 90 to 95% by weight, based on the weight of the third ethylene copolymer, ethylene derived units; and,
- (ii) 5 to 10% by weight, based on the weight of the third ethylene copolymer, at least one additional second olefin derived units wherein the second olefin derived units are selected from second comonomers comprising 4-8 carbon atoms, and wherein the third ethylene copolymer has:
- (iii) a third molecular weight wherein the third molecular weight is higher than the second molecular weight, and
- (iv) a viscosity number, $VN_3$, between 200 and 250 $cm^3/g$ wherein the polyethylene molding composition has:
- (i) a density between 0.945 and 0.953 $g/cm^3$ at 23° C.; and,
- (ii) a melt flow index between 4 and 6.5 g/10 min measured at (190° C./5 kg).

2. The high-strength injection-molded screw cap closure of claim 1, wherein the first comonomers and the second comonomers are selected from the groups comprising 1-butene, 1-pentene, 1-hexene, 1-octene, 4-methyl-1-pentene or a combination thereof.

3. The high-strength injection-molded screw cap closure of claim 1, wherein the viscosity number, $VN_3$, is between 210 and 240 $cm^3/g$.

4. The high-strength injection-molded screw cap closure of claim 1, wherein the viscosity number, VN1, is between 140 and 160 $cm^3/g$.

5. The high-strength injection-molded screw cap closure of claim 1, wherein the polyethylene molding composition has a density between 0.948 and 0.953 $g/cm^3$.

6. The high-strength injection-molded screw cap closure of claim 1, wherein the polyethylene molding composition is trimodal.

7. A high-strength injection-molded screw cap closure comprising:
a polyethylene molding composition having a multimodal molecular mass distribution and comprising:
- (A) 40 to 45% by weight of a first ethylene homopolymer fraction having:
  - (i) a first molecular weight; and
  - (ii) a viscosity number, $VN_1$, between 130 and 160 $cm^3/g$;
- (B) 35 to 40% by weight of a second ethylene copolymer fraction comprising:
  - (i) 98 to 99% by weight, based on the weight of the second ethylene copolymer, ethylene derived units; and,
  - (ii) 1 to 2% by weight, based on the weight of the second ethylene copolymer, 1-butene derived units, wherein the second ethylene copolymer fraction has:
- (iii) a second molecular weight wherein the second molecular weight is higher than the first molecular weight;
- (iv) a molecular weight distribution (Mw/Mn) between 6 and 10; and,
- (v) a viscosity number, $VN_2$, between 155 and 170 $cm^3/g$;

(C) 15 to 20% by weight of a third ethylene copolymer comprising:
- (i) 92 to 93% by weight, based on the weight of the third ethylene copolymer, ethylene derived units; and,
- (ii) 7 to 8% by weight, based on the weight of the third ethylene copolymer, 1-butene derived units, and wherein the third ethylene copolymer has:
- (iii) a third molecular weight wherein the third molecular weight is higher than the second molecular weight, and
- (iv) a viscosity number, $VN_3$, between 210 and 230 $cm^3/g$ wherein the polyethylene molding composition has:
- (i) a density between 0.945 and 0.953 $g/cm^3$ at 23° C.; and,
- (ii) a melt flow index between 7 and 9 g/10 min measured at (190° C./5 kg).

8. A process for producing a high-strength injection-molded screw cap closure comprising the step of:
polymerizing a polyethylene molding composition wherein the polyethylene molding composition has a multimodal molecular mass distribution and comprises:
- (A) 40 to 45% by weight of a first ethylene homopolymer fraction having:
  - (i) a first molecular weight; and
  - (ii) a viscosity number, $VN_1$, between 130 and 160 $cm^3/g$;
- (B) 35 to 40% by weight of a second ethylene copolymer fraction comprising:
  - (i) 96 to 99.4% by weight, based on the weight of the second ethylene copolymer, ethylene derived units; and,
  - (ii) 0.6 to 4% by weight, based on the weight of the second ethylene copolymer, at least one additional first olefin derived units wherein the first olefin derived units are selected from first comonomers comprising 4-8 carbon atoms, wherein the second ethylene copolymer fraction has:
- (iii) a second molecular weight wherein the second molecular weight is higher than the first molecular weight;
- (iv) a molecular weight distribution (Mw/Mn) between 6 and 10; and,
- (v) a viscosity number, $VN_2$, between 155 and 170 $cm^3/g$;

(C) 15 to 20% by weight of a third ethylene copolymer comprising:
- (i) 90 to 95% by weight, based on the weight of the third ethylene copolymer, ethylene derived units; and,
- (ii) 5 to 10% by weight, based on the weight of the third ethylene copolymer, at least one additional second olefin derived units wherein the second olefin derived units are selected from second comonomers comprising 4-8 carbon atoms, and wherein the third ethylene copolymer has:
- (iii) a third molecular weight wherein the third molecular weight is higher than the second molecular weight, and
- (iv) a viscosity number, $VN_3$, between 200 and 250 $cm^3/g$ wherein the polyethylene molding composition has:
- (i) a density between 0.945 and 0.953 $g/cm^3$ at 23° C.; and,
- (ii) a melt flow index between 4 and 6.5 g/10 min measured at (190° C./5 kg).

* * * * *

UNITED STATES PATENT AND TRADEMARK OFFICE
CERTIFICATE OF CORRECTION

PATENT NO.         : 8,663,790 B2
APPLICATION NO.    : 12/735139
DATED              : March 4, 2014
INVENTOR(S)        : Joachim Berthold et al.

Page 1 of 1

It is certified that error appears in the above-identified patent and that said Letters Patent is hereby corrected as shown below:

Specification

| | | |
|---|---|---|
| Column 7 | Line 17 | Delete "58° A)" and insert --58 %-- |
| Column 7 | Line 17 | Delete "29° A)" and insert --29 %-- |
| Column 7 | Line 18 | Delete "2° A)" and insert --2 %-- |
| Column 8 | Line 19 | Delete "1.5° A)" and insert --1.5 %-- |
| Column 8 | Line 22 | Delete "72° A)" and insert --72 %-- |
| Column 8 | Line 22-23 | Delete "14° A)" and insert --14 %-- |

Claims

| | | |
|---|---|---|
| Column 11 | Line 5 | In Claim 1, delete "(Mw/Mn)" and insert --$(M_w/M_n)$-- |
| Column 11 | Line 37 | In Claim 4, delete "VN1" and insert --$VN_1$-- |
| Column 11 | Line 65 | In Claim 7, delete "(Mw/Mn)" and insert --$(M_w/M_n)$-- |
| Column 12 | Line 43 | In Claim 8, delete "(Mw/Mn)" and insert --$(M_w/M_n)$-- |

Signed and Sealed this
First Day of March, 2016

Michelle K. Lee
*Director of the United States Patent and Trademark Office*